US 8,739,746 B2

(12) United States Patent
Bidner et al.

(10) Patent No.: US 8,739,746 B2
(45) Date of Patent: Jun. 3, 2014

(54) VARIABLE OIL PUMP DIAGNOSTIC

(75) Inventors: David Karl Bidner, Livonia, MI (US);
John Eric Rollinger, Sterling Heights, MI (US); John Smiley, Southfield, MI (US); Ed Badillo, Flat Rock, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 38 days.

(21) Appl. No.: 13/362,908

(22) Filed: Jan. 31, 2012

(65) Prior Publication Data

US 2013/0192545 A1    Aug. 1, 2013

(51) Int. Cl.
*F01P 11/14*    (2006.01)
*F01P 5/14*    (2006.01)

(52) U.S. Cl.
USPC ................................. 123/41.15; 123/196 R

(58) Field of Classification Search
USPC ................................. 123/41.15, 196 R, 196 S
See application file for complete search history.

(56) References Cited

U.S. PATENT DOCUMENTS

| 5,604,441 | A | * | 2/1997 | Freese et al. ................ 324/663 |
| 5,724,941 | A | * | 3/1998 | Suzuki et al. ............ 123/339.15 |
| 7,823,545 | B2 | | 11/2010 | Arvan et al. |
| 2009/0229561 | A1 | | 9/2009 | Yamashita et al. |
| 2010/0001103 | A1 | * | 1/2010 | Neto et al. .................... 239/583 |
| 2010/0147256 | A1 | * | 6/2010 | Takahashi ................. 123/196 S |
| 2010/0299045 | A1 | | 11/2010 | Moriya et al. |
| 2011/0224883 | A1 | * | 9/2011 | Bruno et al. ................ 701/102 |

FOREIGN PATENT DOCUMENTS

GB    2345738 A    7/2000

* cited by examiner

*Primary Examiner* — Lindsay Low
*Assistant Examiner* — Jacob Amick
(74) *Attorney, Agent, or Firm* — Julia Voutyras; Alleman Hall McCoy Russell & Tuttle LLP

(57) ABSTRACT

Embodiments for indicating degradation of a piston-cooling jet system are provided. In one example, an engine method comprises indicating degradation of a piston-cooling jet system in response to a relationship between engine speed and oil pressure at maximum oil pump displacement conditions. In this way, engine operation may be adjusted in response to an indicated degradation.

17 Claims, 5 Drawing Sheets

VARIABLE OIL PUMP DIAGNOSTIC

FIELD

The present disclosure relates to methods for diagnosing component degradation with a variable pressure oil pump.

BACKGROUND AND SUMMARY

Variable flow oil pumps may provide engine oil at a pressure optimized for efficient engine operation, improving fuel efficiency. Additionally, the use of piston-cooling jets may provide enhanced piston cooling at high engine speeds and loads, allowing engine operation at these operating points. However, with the inclusion of variable flow oil pumps and/or piston-cooling jets, new and additional components in the lubrication system are provided. These new components may not be currently accounted for in current methods to detect and/or diagnose component degradation.

One approach for diagnosing degradation of piston-cooling jets is disclosed in U.S. Patent Application No. 2011/0224883. Here, a method for diagnosing degradation of a piston-cooling jet valve to open may be determined based on variation in engine oil pressure due to a commanded switch of the valve. However, this method relies on particular operation of a controllable valve. Further, the degradation detection may provide erroneous results due to the changing oil pressure provided by a variable flow oil pump, due to oil pressure fluctuations in addition to those caused by the commanded valve switch.

The inventors have recognized the issues with the above approach and offer a method to at least partly address them. In one embodiment, an engine method comprises indicating degradation of a piston-cooling jet system in response to a relationship between engine speed and oil pressure at maximum oil pump displacement conditions.

In this way, identification of degradation of a piston-cooling jet system may be determined. In one example, the relationship may be used to determine the spring preload set point of a check valve of the piston-cooling jet, and if the set point is outside an expected range, engine control strategies may be adapted to account for the change. Further, if degradation is indicated, an operator may be notified, and engine operating parameters may be adjusted in order to reduce engine issues due to the degraded piston-cooling jets.

The present disclosure may offer several advantages. For example, engine lubrication efficiency may be increased by determining the functioning of various lubrication components. By increasing engine efficiency, fuel economy may be improved. Furthermore, by detecting worn or low-functioning components, an operator of the vehicle may be notified and/or engine control strategies may be adjusted to compensate for the worn components, reducing the likelihood engine components will suffer degradation resulting from operation with undesired engine oil pressure.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Piston-cooling jets may provide oil to the underside of a piston, cooling the piston and the corresponding combustion chamber. Piston cooling may be beneficial during conditions of high engine output and/or in boosted engines. The piston-cooling jets are provided with engine oil and controlled via a check valve that is set to open under relatively high engine oil pressure. An additional burden may be placed on the oil pump during these conditions, decreasing engine efficiency. To overcome this, the engine may be operated with a variable flow displacement pump, which is controlled to provide high oil pump output during conditions where cooling of the pistons is indicated, but provide lower output when piston cooling is not indicated. Such systems present new lubrication components that have previously been difficult to diagnose for degradation. By monitoring engine oil pressure during select conditions that isolate a change in oil pressure resulting from action of a single component, degradation of lubrication system components may be determined. In one example, the engine oil pressure at which the check valve controlling the piston-cooling jet opens may be monitored, and if it varies from the expected pressure by more than a threshold, engine operating parameters may be adjusted to avoid engine degradation due to the degraded piston-cooling jet system.

Figure 1:
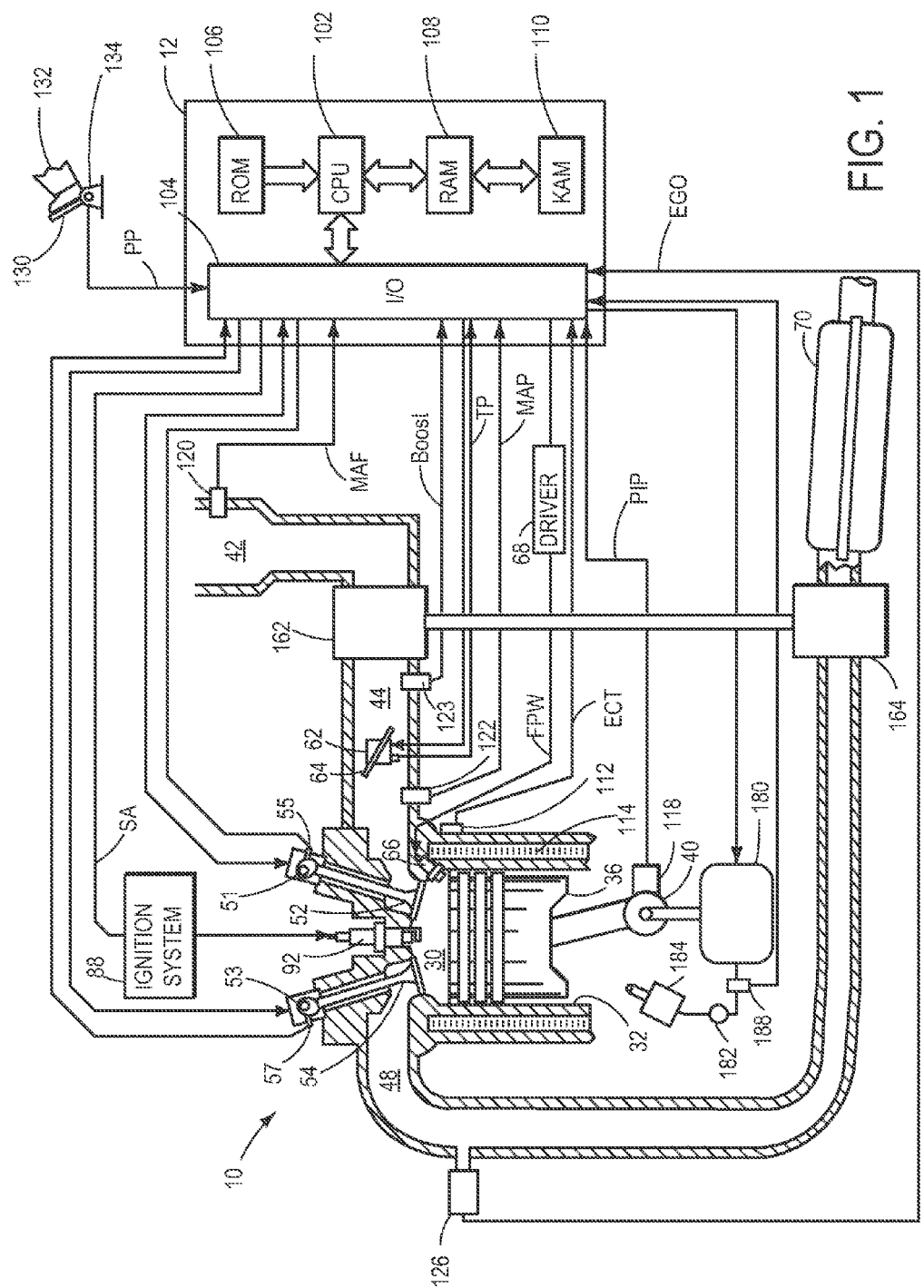
FIG. 1 shows a schematic diagram of an example engine.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. For example, valve operation may be varied as part of pre-ignition abatement or engine knock abatement operations. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Engine 10 may further include a compression device such as a turbocharger or supercharger including at least a compressor 162 arranged along intake manifold 44. For a turbocharger, compressor 162 may be at least partially driven by a turbine 164 (e.g. via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. A boost sensor 123 may be positioned downstream of the compressor in intake manifold 44 to provide a boost pressure (Boost) signal to controller 12.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 42 in a configuration that provides what is known as port injection of fuel into the intake port upstream of combustion chamber 30. Fuel injector 66 may be controlled to vary fuel injection in different cylinder according operating conditions. For example, controller 12 may command fuel injection to be stopped in one or more cylinders as part of pre-ignition abatement operations so that combustion chamber 30 is allowed to cool. Further, intake valve 52 and/or exhaust valve 53 may be opened in conjunction with the stoppage of fuel injection to provide intake air for additional cooling.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Controller 12 may vary signal SA based on operating conditions. For example, controller may retard signal SA in order to retard spark in response to an indication of engine knock as part of engine knock abatement operations. Though spark ignition components are shown, in some embodiments, combustion chamber 30 or one or more other combustion chambers of engine 10 may be operated in a compression ignition mode, with or without an ignition spark.

Variable flow oil pump 180 can be coupled to crankshaft 40 to provide rotary power to operate the variable flow oil pump 180. In one example, the variable flow oil pump 180 includes a plurality of internal rotors (not shown) that are eccentrically mounted. At least one of the internal rotors can be controlled by controller 12 to change the position of that rotor relative to one or more other rotors to adjust an output flow rate of the variable flow oil pump 180 and thereby adjusted the oil pressure. For example, the electronically controlled rotor may be coupled to a rack and pinion assembly that is adjusted via the controller 12 to change the position of the rotor. The variable flow oil pump 180 may selectively provide oil to various regions and/or components of engine 10 to provide cooling and lubrication. The output flow rate or oil pressure of the variable flow oil pump 180 can be adjusted by the controller 12 to accommodate varying operating conditions to provide varying levels of cooling and/or lubrication. Further, the oil pressure output from the variable flow oil pump 180 may be adjusted to reduce oil consumption and/or reduce energy consumption by the variable flow oil pump 180.

It will be appreciated that any suitable variable flow oil pump configuration may be implemented to vary the oil pressure and/or oil flow rate. In some embodiments, instead of being coupled to the crankshaft 40 the variable flow oil pump 180 may be coupled to a camshaft, or may be powered by a different power source, such as a motor or the like. The variable flow oil pump 180 may include additional components not depicted in FIG. 1, such as a hydraulic regulator, electro-hydraulic solenoid valve, etc.

Oil injector 184 may be coupled downstream of an output of the variable flow oil pump 180 to selectively receive oil from the variable flow oil pump 180. In some embodiments, the oil injector 184 may be incorporated into the combustion chamber walls 32 of the engine cylinder and may receive oil from galleries formed in the walls. The oil injector 184 may be operable to inject oil from the variable flow oil pump 180 onto an underside of piston 36. The oil injected by oil injector 184 provides cooling effects to the piston 36. As such, oil injector 184 may be a piston-cooling jet. Furthermore, through reciprocation of piston 36, oil is drawn up into combustion chamber 30 to provide cooling effects to walls of the combustion chamber 30.

A valve 182 may be positioned between the output of the variable flow oil pump 180 and the oil injector 184 to control flow of oil to the oil injector 184. In some embodiments, the valve 182 may be a check valve that is set to open at a predefined pressure or temperature level at which operation of the oil injector 184 is desired to provide cooling effects. In some embodiments, the check valve may be integrated in to the assembly of the oil injector 184. The check valve may have a spring preload set point that, when oil pressure is greater than the set point, is configured to open.

In some embodiments, the valve 182 may be an electronically actuatable valve that is controlled by controller 12. The valve 182 may be actuatable to provide oil to the oil injector 184 in response to temperature in the combustion chamber 30 being above a threshold. Correspondingly, the valve 182 may be actuatable to stop injection of oil by the oil injector in response an operating condition, such as a cylinder temperature becoming less than a threshold at which cooling effects are less desired than reduced oil consumption and/or oil deposits in the combustion chamber.

The controller 12 may adjust operation of the variable flow oil pump 180 in response to various operating conditions, such as engine temperature, engine speed, etc. For example, the controller may adjust oil output from the variable flow oil pump 180 to adjust oil injection of the oil injector 184 to be injected onto the piston 36. More particularly, oil injection may be adjusted to a first amount in response to a first engine temperature and adjusted to a second amount that is different from the first amount in response to a second, different engine temperature. For example, oil injection may be increased to a higher flow rate or injection pressure in response to the indication of increased engine temperature. In this way, a greater cooling effect may be provided to reduce the risk of degradation of the piston 36, combustion chamber 30, or other effects. In other examples, the controller 12 may adjust operation of the variable flow oil pump 180 in response to the engine being in boosted vs. non-boosted conditions (e.g., when compressed air is diverted to the engine, the variable flow oil pump 180 may be controlled to increase output), or in response to engine speed and load.

Exhaust gas sensor 126 is shown coupled to exhaust passage 48 upstream of emission control device 70. Sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air-fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Furthermore, controller 12 may receive signals that may be indicative of pre-ignition or engine knock in the combustion chamber 30. For example, engine coolant temperature (ECT) from temperature sensor 112 coupled to cooling sleeve 114 may be sent to controller 12 to indicate whether or not the temperature of the combustion chamber is in range in which pre-ignition may occur. Controller 12 may adjust oil injection in response to an indication of pre-ignition that includes an engine temperature being greater than a threshold. Controller 12 may receive an indication of oil pressure from pressure sensor 188 positioned downstream of the output of the variable flow oil pump 180. The oil pressure indication may be used by the controller 12 to control adjustment of oil pressure by varying oil flow rate output from the oil pump.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, oil injector, etc.

The configurations illustrated above enable various methods for diagnosing lubrication system component degradation during operation of the variable flow oil pump. Accordingly, some such methods are now described, by way of example, with continued reference to above configurations. It will be understood, however, that these methods, and others fully within the scope of the present disclosure, may be enabled via other configurations as well.

Figure 2:
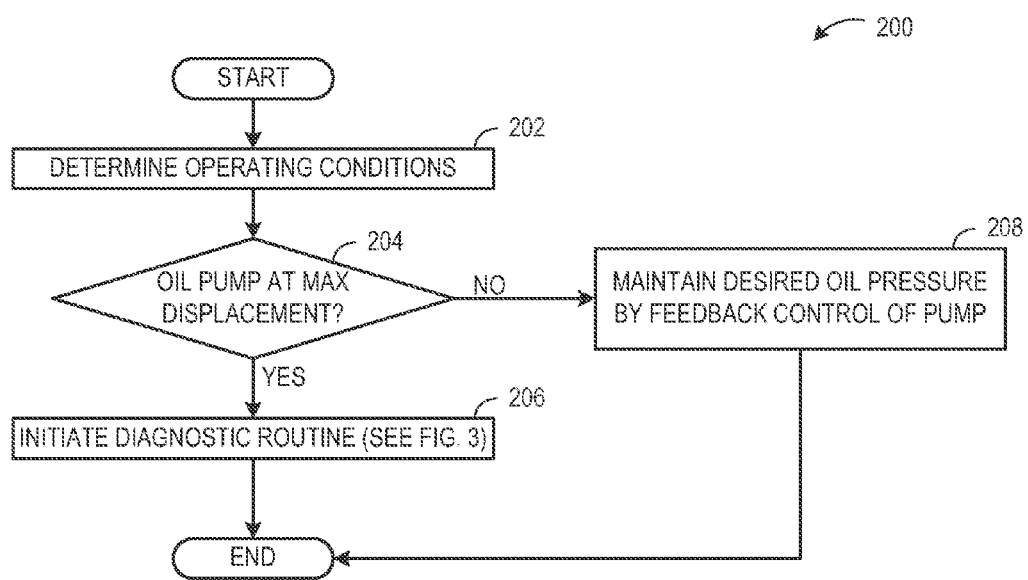
FIG. 2 is a flow chart illustrating an example control routine for operating a variable flow oil pump according to an embodiment of the present disclosure.

Turning to FIG. 2, a method 200 for operating a variable flow oil pump is depicted. Method 200 may be carried out by a controller, such as controller 12, in response to engine operating conditions in order to control a variable flow oil pump, such as oil pump 180. At 202, method 200 includes determining operating conditions. Operating conditions may include engine speed, engine load, engine temperature, the amount of compressed air in the intake from the turbocharger, etc. At 204, it is determined if the variable flow oil pump is operating at maximum displacement. The controller may send a command to the oil pump to operate at maximum displacement during conditions when the maximum output of oil flow from the pump is indicated. These conditions may include engine temperature above a threshold, as additional oil pressure may be needed to operate one or more piston-cooling jets to cool the combustion chambers. Other conditions may include a shift in camshaft position, as the VCT phasers are hydraulically controlled via oil pressure. Further, during conditions of high engine speed and load and/or during boosted conditions, maximum oil flow may be indicated. If it is determined that the oil pump is operating at maximum displacement, method 200 proceeds to 206 to initiate a diagnostic routine for the piston-cooling jet system, which will be described in more detail with reference to FIG. 3. Briefly, when the oil pump is operating at maximum displacement, the engine is essentially operating with unregulated oil pressure. Because the oil pressure is not controlled by the controller but rather by the relationship between oil temperature and engine speed, the change in oil pressure vs. engine speed may be monitored to diagnose degradation of certain lubrication system components, such as the valves controlling the piston-cooling jets, as described below.

If the oil pump is not operating at maximum displacement, method 200 proceeds to 208 to maintain desired oil pressure by feedback control of the oil pump. Feedback control of the oil pump may include receiving a signal from an oil pressure sensor, such as sensor 188, and adjusting the oil pump to output an oil flow to reach a desired oil pressure. Under some conditions, less than maximum oil pump displacement may be desired to reduce the energy losses associated with oil pump operation when high oil pressures are not needed. For example, if the engine temperature is below a threshold, such as below warmed-up operating temperature, additional cooling provided by the cooling jets would not be advantageous. As a result, desired oil pressure may be lower than the set point of the check valves controlling the cooling jets, and as such the oil pump may be operated at less-than maximum displacement. In another example, if the engine is not operating with significant boost, such as during a launch following a stop of the vehicle or when the exhaust temperature is low, the oil pump may be controlled to less-than-maximum displacement. Upon initiating a diagnostic routine at 206 or maintaining desired oil pressure via feedback control at 208, method 200 ends.

Figure 3:
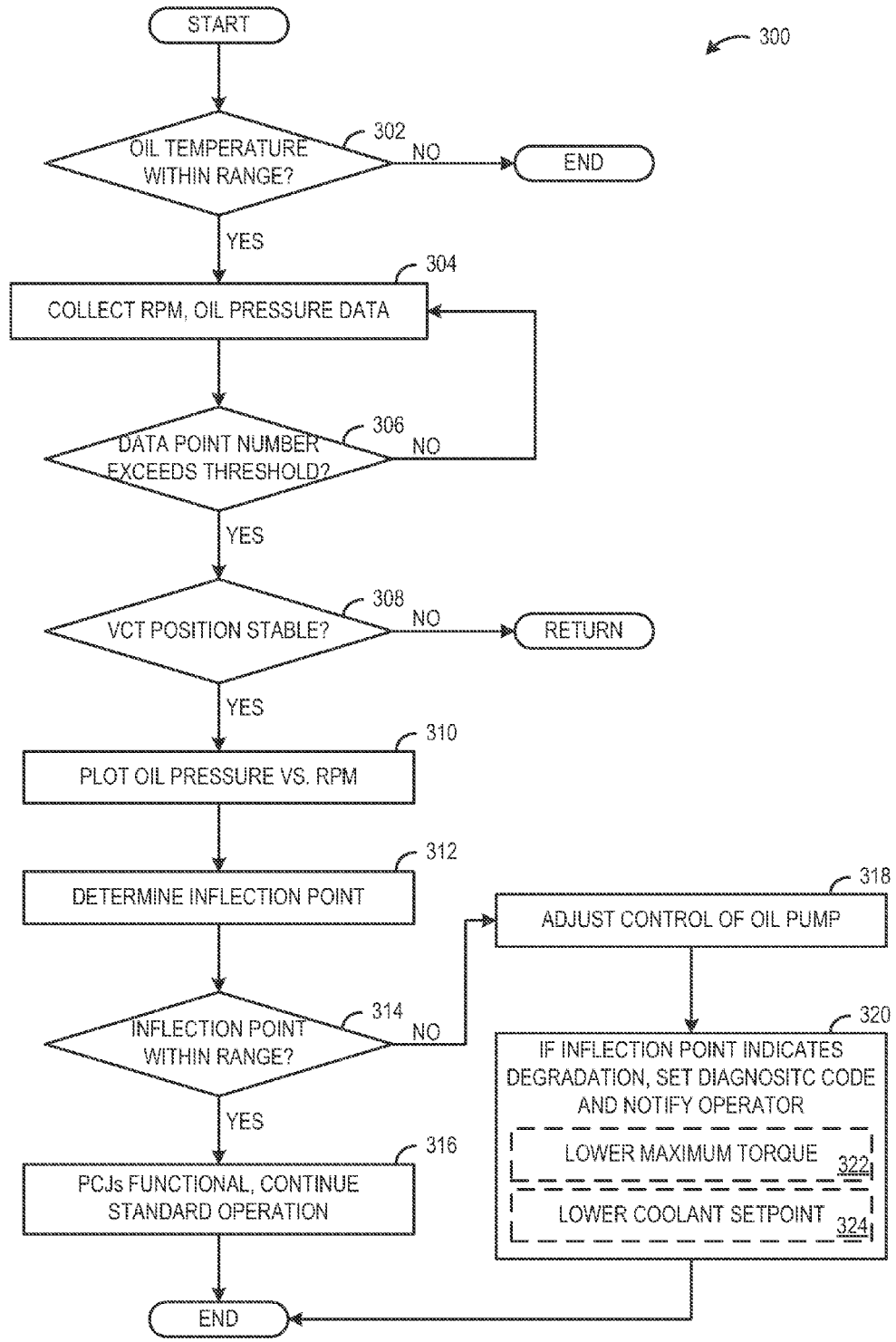
FIG. 3 is a flow chart illustrating an example control routine for diagnosing a piston-cooling jet system with a variable flow oil pump according to an embodiment of the present disclosure.

FIG. 3 illustrates a method 300 for diagnosing degradation of a piston-cooling jet system. Method 300 may be carried out by instructions stored in the memory of controller 12 in response to the variable flow oil pump 180 being operated at maximum displacement. Method 300 includes, at 302, determining if oil temperature is within a threshold range. Oil temperature may be determined by a sensor in a gallery of the engine, or may be inferred from engine coolant temperature or other operating parameters. The threshold oil temperature range may be a suitable range in which the oil pressure increases as a function of engine speed, such as increasing linearly with increasing engine speed. As the viscosity of the oil increases with decreasing oil temperature, very low oil temperature or very high oil temperature may result in oil pressure fluctuations leading to erroneous degradation detection. If the oil temperature is not within the threshold range, method 300 ends. If the oil temperature is in the threshold range, method 300 proceeds to 304 to collect engine speed (e.g., RPMs) and oil pressure data and store it in the memory of the controller. At 306, it is determined if the number of data points collected exceeds a threshold. The threshold number data points may be a fixed number of data points, such as 100, or may vary based on engine speed or oil temperature. For example, if engine speed is held constant, data points may continue to be collected until engine speed changes, in order to collect a wide range of engine speed data points. If the threshold number of data points has not been reached, method 300 returns to 304 to continue to collect speed and pressure data. If the threshold has been reached, method 300 proceeds to 308 to determine if the VCT position is stable. As explained previously, shifts in the position of the camshaft of a VCT system are enabled via oil routed to the VCT phaser. This may result in oil pressure fluctuations that may confound accurate degradation determination. If the VCT position is not stable during the duration of the data collection, method 300 returns.

Figure 5:
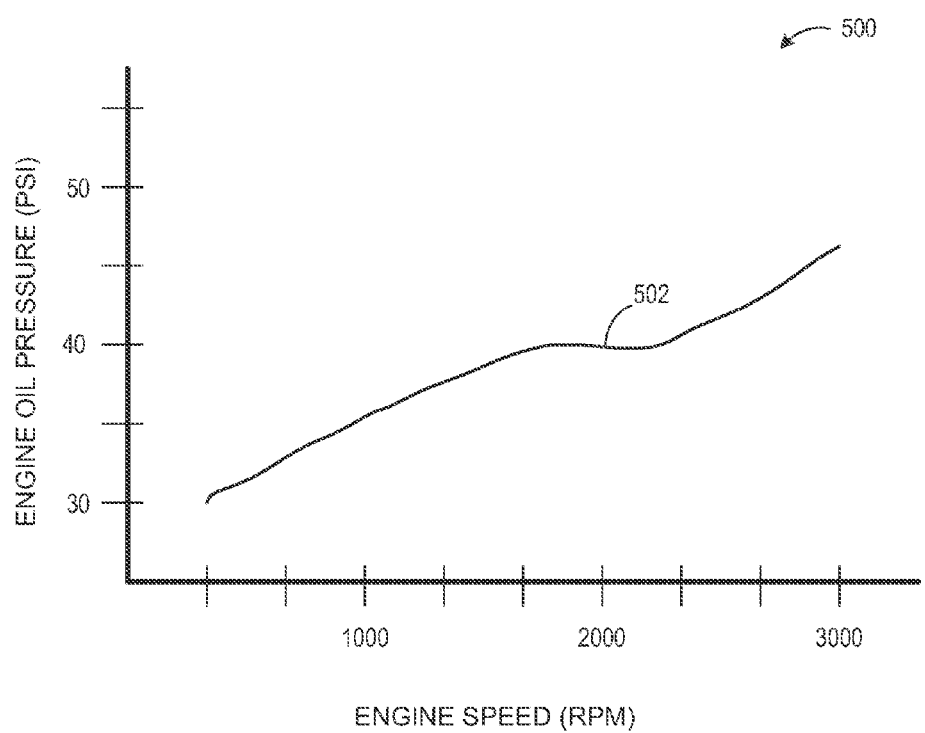
FIG. 5 is an example engine oil pressure response curve according to an embodiment of the present disclosure.

If the VCT position is stable during the data collection, that is if the camshaft position changes by less than a threshold amount (e.g., does not change), method 300 proceeds to 310 to plot the oil pressure versus the engine speed in a response curve. FIG. 5 shows an example pressure vs. speed response curve 500. The response curve may include an inflection point 502. The inflection point may represent the oil pressure at which a check valve controlling a piston-cooling jet opens. As such, the rise in oil pressure due to increasing engine speed may temporarily cease, as the pressure relief from the opening of the valve may offset the rising oil pressure.

Returning to FIG. 3, at 312 the oil pressure at the inflection point is determined. At 314, it is determined if the inflection point is within a threshold range. As explained above, during maximum oil pump displacement with oil temperature in range and no change in position of the VCT system, the inflection point represents the spring preload set point of the check valve controlling the piston-cooling jet. If the inflection point is within a threshold range of the preload set point, such as within 10% of the set point, it indicates the check valve is functional and opening at the correct oil pressure. At such, method 300 proceeds to 316 to indicate a function piston-cooling jet system, and continue engine operation with the current control routine for the oil pump. However, if the inflection point is outside the threshold range, it indicates a degradation of the piston-cooling jet system.

Thus, if it is determined at 314 that the inflection point is outside the range, method 300 proceeds to 318 to adjust the control routine of the oil pump. Adjusting the control routine of the oil pump may vary depending on if the inflection point is higher or lower than the preload set point of the check valve. If the inflection point is higher, it indicates the check valve is opening at a higher oil pressure than the control routine is based on, e.g., the check valve is not opening at the desired oil pressure but is instead opening at a higher than desired oil pressure. This may cause a delay in the oil provided to the piston-cooling jets. To compensate, the control routine may be adjusted to operate the pump with higher output when engine temperature exceeds a threshold (for example, when engine temperature is high enough to necessitate additional cooling from the piston-cooling jets). However, because the oil pump is frequently operated at maximum displacement to provide the oil pressure to open the check valves, it may not be possible to operate the pump with higher output. In such conditions, other engine operating parameters may be adjusted, such as limiting the maximum available engine torque, to lower engine temperature without the use of the piston-cooling jets. For example, if the operator has the pedal position at the maximum position, then the engine output torque that would otherwise have been provided is not provided, but rather a lower engine torque is provided for the given condition.

If the inflection point is lower than the preload set point, it indicates the check valve is opening at lower oil pressure than the control routine is based on, e.g., the check valve is not opening at the desired pressure but is instead opening at a lower than desired oil pressure. This may cause the piston-cooling jets to receive oil when the engine temperature is not high enough to warrant it, causing unnecessary cooling to the engine, reducing engine efficiency, wasting fuel and degrading emissions. To compensate, the oil pump displacement may be lowered in certain conditions to lower the oil pressure reaching the check valve.

At 320, if the inflection point indicates degradation of the piston-cooling jet system, a diagnostic code for the piston-cooling jet degradation may be set, and an operator of the vehicle may be notified, for example by lighting a malfunction indicator lamp. Degradation may be indicated if the inflection point is significantly outside the threshold range. In one example, the check valve may be degraded to the point where it is always open, and as such there may be no inflection point, or a very low inflection point. Or, the check valve may be stuck closed, causing no inflection point or a very high inflection point. If the piston-cooling jet system is degraded, continued engine operation under standard conditions may result in engine degradation. To avoid this, if degradation is indicated, the maximum allowed torque of the engine may be lowered at 322. Further, the engine coolant temperature set point may be lowered at 324, to ensure engine temperature does not reach high enough temperature to degrade any engine components. This may include adjusting an engine coolant temperature control system, such as an electronically controlled system, to lower the desired coolant temperature. For example, an electronic thermostat valve, or variable speed coolant pump may be controlled such that the actual coolant temperature approaches the desired coolant temperature. Upon diagnosing the piston-cooling jet system, method 300 ends.

Thus, method 200 of FIG. 2 provides for operating a variable flow oil pump. During certain conditions, such as when the oil pump is unregulated (e.g., when the pump is operating at maximum displacement) a diagnostic routine as provided by method 300 of FIG. 3 may be initiated to determine if the piston-cooling jet system is functional. In this way, feedback control of the oil pump may be maintained and degradation of the piston-cooling jet system may be determined.

Method 300 of FIG. 3 may provide for an engine method comprising during select conditions, reducing engine oil output from a variable flow oil pump if an inflection point between engine speed and oil pressure at maximum oil pump displacement is below a first threshold, and during the select conditions, increasing engine oil output from the variable flow oil pump if the inflection point is above a second threshold. The method may also include, if the inflection point is above the second threshold and during the select conditions the engine oil output is at maximum output, lowering maximum available engine torque and/or lowering a coolant temperature set point.

Figure 4:
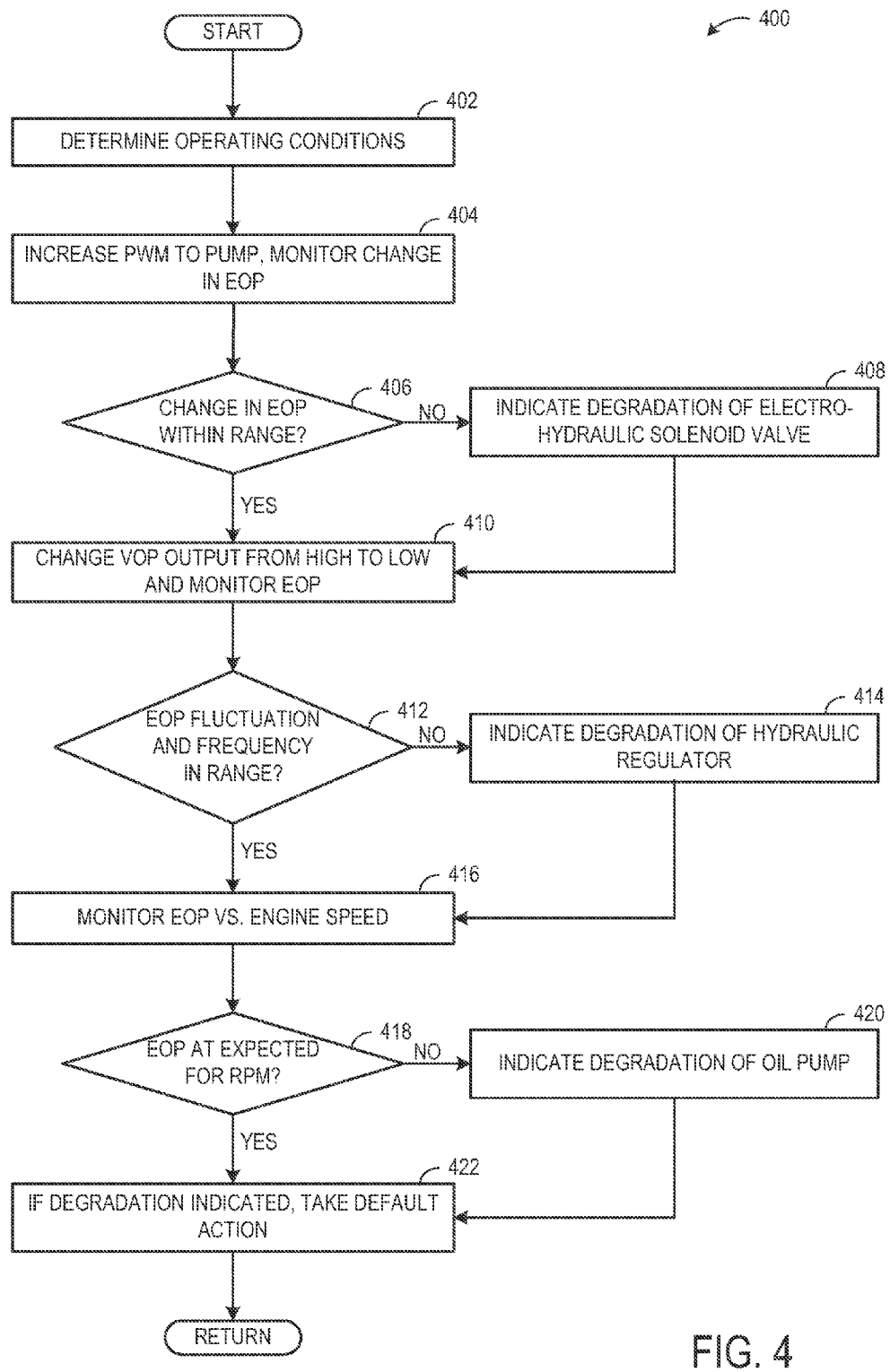
FIG. 4 is a flow chart illustrating an example control routine for diagnosing additional lubrication system components according to an embodiment of the present disclosure.

Additionally, the variable flow oil pump may be controlled in other conditions to diagnose degradation of additional lubrication system components. FIG. 4 illustrates a method 400 for diagnosing lubrication system components. Method 400 may be carried out by controller 12 in response to feedback provided by various engine sensors, such as oil pressure sensor 188.

At 402, method 400 includes determining operating conditions. Operating conditions may include engine speed, load, and temperature, as well as oil pressure, oil pump output, etc. At 404, the pulse width modulation (PWM) to the oil pump is increased to increase oil pump output, and a resulting change in engine oil pressure (EOP) is monitored. The output to the oil pump may be increased to monitor resultant oil pressure change if the oil temperature in within a threshold range, if engine speed is constant, if oil pressure is below a threshold (e.g., below the pressure at which the check valves open), and if camshaft position is stable. During these conditions, any changes to the engine oil pressure that deviate from an expected oil change may be attributed to an electro-hydraulic solenoid valve of the oil pump. At 406, it is determined if the change in EOP is within an expected range for the current engine speed and oil temperature. The expected range may be based on a table stored in the memory of the controller. If the change in EOP is not within the expected range, method 400 proceeds to 408 to indicate degradation in the electro-hydraulic solenoid valve.

Method 400 then proceeds to 410. Also, if the change in EOP is within the expected range, method 400 proceeds to 410 to change the variable flow oil pump (VOP) output from high to low, and monitor the change in EOP. The conditions for carrying this out are similar to the conditions described above, e.g., constant engine speed, oil temperature in range, etc. At 412, it is determined if a fluctuation of the EOP and a frequency of the EOP response are in an expected range. When the VOP output is switched from high to low, a ripple effect occurs from the VOP regulator, causing a wave in the oil pressure as it drops. The difference in the peak heights and frequency of the peaks may be monitored to diagnose the state of the regulator. If the fluctuation and frequency are not in range, for example if the peak height difference is large and the frequency is low, method 400 proceeds to 414 to indicate degradation in the hydraulic regulator of the oil pump.

Method 400 then proceeds to 416. Also, if the EOP fluctuation and frequency are in range at 412, method 400 proceeds to 416 to monitor the change in EOP as a function of engine speed. Similar to the response curve described above with respect FIG. 3, this response curve may be plotted with data collected during maximum pump displacement, without a shift in the VCT position, and if oil temperature is within range. The EOP should increase as a known function of the engine speed. At 418, it is determined it the EOP is at an expected EOP for a particular engine speed. For example, at maximum pump displacement, the oil pressure may increase linearly as a function of engine speed, and may be expected to be 40 psi at 2000 RPMs.

If it is lower than 40 psi at 2000 RPMs, this may indicate degradation of the pump. As such, if the EOP is not at the expected EOP, method 400 proceeds to 420 indicate degradation of the oil pump. Both 420 and a yes answer from 418 proceed to 422, where, if degradation is indicated at 408, 414, and/or 420, default action is taken. Default action may include setting a diagnostic code, notifying a vehicle operator, and/or adjusting the control routine of the oil pump to reflect the degraded components. After taking default action, or if no degradation is indicated, method 400 returns.

Thus, method 400 of FIG. 4 may provide for an engine method comprising indicating degradation of one or more engine components based on a change in engine oil pressure in response to a change in a variable oil pump output. This may further comprise increasing a pulse width modulation input to the VOP and indicating degradation of an electro-hydraulic solenoid valve in response to a change in the oil pressure that is outside a threshold range. An engine method may also comprise indicating degradation of one or more engine components based on a rate of change of engine oil pressure over a given duration. It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
during a first condition, pumping engine oil at less-than-maximum oil pump displacement to one or more components of an engine;
during a second condition including unregulated oil pressure where the oil pressure does not undergo a commanded change in oil pressure, pumping engine oil at maximum oil pump displacement to the one or more components of the engine; and indicating degradation of a piston-cooling jet system during the second condition in response to a relationship between engine speed and oil pressure at the maximum oil pump displacement, wherein the relationship includes a responsive curve inflection point of the oil pressure, and wherein the response curve inflection point is determined responsive to the engine oil being pumped at maximum oil pump displacement.

2. The engine method of claim 1, wherein the inflection point indicates the oil pressure at which a check valve upstream of the piston-cooling jet opens, and wherein the inflection point is determined by collecting multiple engine speed/oil pressure points across a range of engine speeds at maximum oil pump displacement.

3. The engine method of claim 1, wherein the first condition comprises engine temperature below a threshold temperature, and wherein the second condition comprises engine temperature above the threshold temperature.

4. The engine method of claim 1, wherein the relationship is determined when a change in variable camshaft timing is less than a threshold.

5. The engine method of claim 1, wherein indicating degradation of the piston-cooling jet system further comprises setting a diagnostic code for the piston-cooling jet degradation and notifying a vehicle operator.

6. The engine method of claim 1, further comprising, in response to the indication of degradation, lowering maximum available engine torque.

7. The engine method of claim 1, further comprising, in response to the indication of degradation, lowering an engine coolant temperature set point.

8. An engine method, comprising:
during a first condition, pumping engine oil at less-than-maximum oil pump displacement from a variable flow oil pump to one or more components of an engine;
during a second condition, pumping engine oil at maximum oil pump displacement from the variable flow oil pump to the one or more components of the engine and determining an inflection point between engine speed and oil pressure representing an oil pressure at which a passive check valve of a piston-cooling jet system opens, the inflection point determined by collecting multiple engine speed/oil pressure points across a range of engine speeds from low engine speed to high engine speed;
reducing engine oil output from the variable flow oil pump if the inflection point is below a first threshold, and
increasing engine oil output from the variable flow oil pump if the inflection point is above a second threshold.

9. The engine method of claim 8, wherein the second condition comprises engine temperature being above a threshold, and wherein the first condition comprises engine temperature being below the threshold.

10. The engine method of claim 8, wherein the second condition comprises engine speed and load exceeding a threshold, and wherein the inflection point is not determined during the first condition.

11. The engine method of claim 8, further comprising, if the inflection point is above the second threshold and engine oil output is at maximum output, lowering maximum available engine torque and/or lowering a coolant temperature set point.

12. An engine system, comprising:
a variable flow oil pump;
a piston cooling jet system including a passive preloaded spring check valve; and
a controller including instructions to:
when operating at less-than-maximum oil pump displacement, maintain desired oil pressure by feedback control of the oil pump;
indicate degradation of the passive preloaded spring check valve in response to a change in an inflection point between engine speed and oil pressure at maximum oil pump displacement comprising unregulated oil pressure where the oil pressure does not undergo a commanded change, the inflection point determined by collecting multiple engine speed/oil pressure points across a range of engine speeds from low engine speed to high engine speed; and
lower one or more of a maximum available engine torque and an engine coolant temperature set point in response to the indicated degradation.

13. The engine system of claim 12, wherein the change in the inflection point is determined during stable variable camshaft timing conditions.

14. The engine system of claim 12, wherein the change in the inflection point is determined during conditions where oil temperature is in a threshold range.

15. The engine system of claim 12, wherein a decrease in the inflection point indicates a decrease in a set point of the check valve, and in response to the decrease in the set point, decreasing oil pump output when engine temperature exceeds a threshold.

16. The engine system of claim 12, wherein an increase in the inflection point indicates an increase in a set point of the check valve, and in response to the increase in the set point, increasing oil pump output when engine temperature exceeds a threshold.

17. The engine system of claim 12, wherein the controller includes further instructions to, if a determined oil pressure at a given engine speed is lower than an expected oil pressure, indicate degradation of the variable flow oil pump.

* * * * *